United States Patent [19]

Takahashi et al.

[11] Patent Number: 4,694,688
[45] Date of Patent: Sep. 22, 1987

[54] CRANK ANGLE SENSOR

[75] Inventors: Tadashi Takahashi; Kunio Miyashita; Syooichi Kawamata, all of Hitachi, Japan

[73] Assignee: Hitachi, Ltd., Tokyo, Japan

[21] Appl. No.: 825,975

[22] Filed: Feb. 4, 1986

[30] Foreign Application Priority Data

Feb. 8, 1985 [JP] Japan .................................. 60-23305

[51] Int. Cl.$^4$ .......................................... G01M 15/00
[52] U.S. Cl. ....................................... 73/116; 324/208
[58] Field of Search ........................ 73/116; 338/32 R; 324/208; 318/653; 123/494; 340/347 M

[56] References Cited

U.S. PATENT DOCUMENTS 4,262,526  4/1981  Makita et al. ........................... 73/116
4,338,813  7/1982  Hunninghaus et al. ............... 73/116
4,594,548  6/1986  Takahashi et al. ........... 338/32 R X

FOREIGN PATENT DOCUMENTS 179317  12/1980  Japan .
113311   8/1982  Japan .

OTHER PUBLICATIONS

Miyashita, K. et al. Absolute Magnetic Rotary Encoder, International Conference on Industrial Electronics . . . Instrumentation, Nov. 22, '85, pp. 63–67.

Primary Examiner—Jerry W. Myracle
Attorney, Agent, or Firm—Antonelli, Terry & Wands

[57] ABSTRACT

A crank angle sensor comprises a magnetic recording medium rotating synchronously with crankshaft on which data is magnetically recorded and a magnetic sensor spaced apart from the magnetic medium and detecting the signals to produce rotational angle information. The magnetic recording medium is divided into plural tracks including an angle track and a cylinder track. On the angle track, unitary magnetic poles, serving as the magnetically recorded data are provided with a pitch P corresponding to the angle to be detected. The cylinder track contains unitary magnetic poles arranged adjacent those with a angle track in the pitch P and at locations which are determined by the number of cylinders of the engine. The polarities of the unitary magnetic poles on the cylinder track are the in same arrangement as those of the unitary magnetic poles of the angle track. No magnetic interference occurs between the unitary magnetic poles of the angle track and three of the cylinder track, so that angle signals and cylinder signals can be obtained with high accuracy.

20 Claims, 14 Drawing Figures

FIG. 1
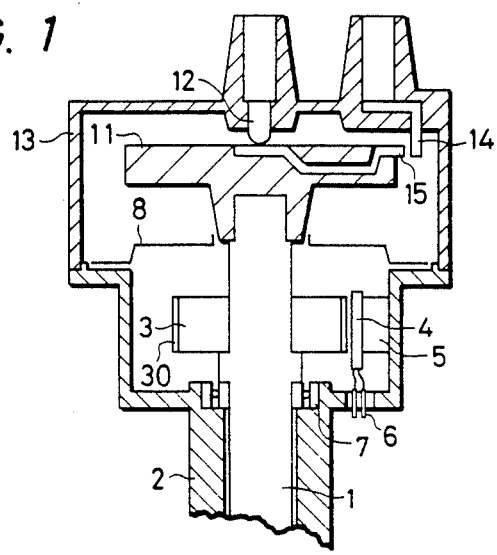
FIG. 2A
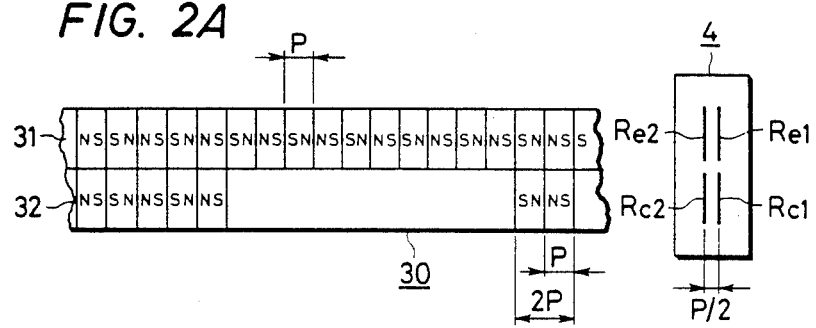
FIG. 2B
FIG. 3
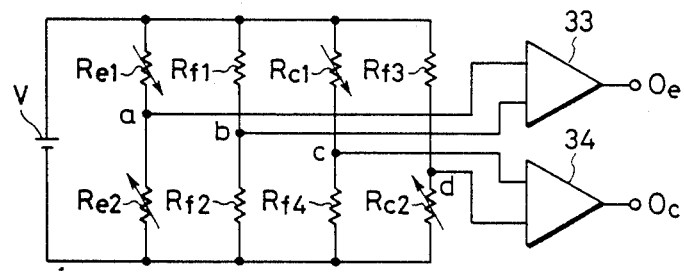

CRANK ANGLE SENSOR

BACKGROUND OF THE INVENTION

1. Field of the Invention

The present invention relates to a crank angle sensor which detects the angular position of the crankshaft of an internal combustion engine, and particularly to one in which magnetoresistive elements are used.

2. Description of the Related Art

Crank angle sensors using magnetoresistive elements are disclosed in Japanese Patent Laid-Open No. 57-133311. The crank angle sensor disclosed therein uses, for example, 3 disks of the same diameter, the peripheries of which are circumferentially divided into n, n×2$^1$ and n×2$^2$ sections respectively, n corresponding to the number of cylinders of an engine. Each section thus divided is provided selectively with either one of magnetic polarities N and S. Those disks are coaxially stacked together to form a cylindrical rotor of the sensor. As a result, codes consisting of 3 bits arranged in the axial direction are circumferentially distributed over the entire surface of the cylindrical rotor. Each code is formed by magnetic polarities N and S which are made to correspond to a logical "1" and "0", respectively. A stator of the sensor made of a magnetoresistive element faces the cylindrical rotor so as to detect the magnetic polarities provided on the circumferential surface of each disk. Since the rotor of the sensor is rotated in synchronism with the rotation of a crankshaft of the engine, the code detected by the sensor indicates the angular position of the crankshaft.

However, the apparatus as described above has the following problem. Mutual magnetic interference occurs between the disks of the rotor, since the disks have different N-S pitches and are stacked close together. Moreover, the difference in the N-S pitch between disks is large. Further, there is another problem in that signal edges are not well defined and accuracy is reduced as the pitch of the magnetic pole of a section increases. Although the edge of a signal becomes well defined and accuracy is excellent when the pitch of the magnetic pole of a section is shortened, the shorter pitch of a magnetic pole increases the mutual magnetic intereference.

Further, a crank angle sensor for use in engine control must be able to detect not only the angular position of the crankshaft, but also other signals, such as a reference signal indicating a reference position of the crankshaft, or a cylinder signal for each respective cylinder. To this end, a detector of the type disclosed in Japanese Utility Model Laid-Open Application No. 55-179317, for example has been proposed. According thereto, information representative of the angular position and the reference position of the crankshaft is provided by magnetic poles arranged separately in two rows on the circumferential surface of a cylindrical rotor. Also in such an apparatus, there occurs the same problem as occurs in the sensor described in the former application, since the N-S magnetic pole pitch for deriving reference position information is different from that for angular position information to a large extent. If the magnetic pole pitch for each of the two types of information is the same, another problem will occur in that the output pulse width of the two types of information will be equal. It is necessary for effecting engine control that the pulse width of the angular position information be several times narrower than that of the reference position information.

SUMMARY OF THE INVENTION

An object of the present invention is to provide a crank angle sensor in which data magnetically encoded on a magnetic recording medium rotating in synchronism with the rotation of a crank shaft of an engine is detected by a magnetic sensor separated from the magnetic recording medium by a prescribed gap therebetween, whereby various types of signals depending on the rotation of the engine crankshaft, including a signal representative of the angular position of the crank-shaft, can be produced accurately without being affected by magnetic interference between the magnetic signals produced from the data recorded on the magnetic medium.

A feature of the present invention is in that the magnetic recording medium is divided into a plurality of tracks on each of which unitary magnetic poles serving as magnetic signal-representative data are provided with a pitch P corresponding to the angle to be detected in the course of the rotation of the crankshaft or in a necessary part of the tracks, and that the polarities of the unitary magnetic poles on a prescribed track are in the same arrangement as those of the unitary magnetic poles of an adjacent track.

BRIEF DESCRIPTION OF THE DRAWINGS

FIG. 1 schematically shows the entire structure of a crank angle sensor for an internal combustion engine to which the present invention is applied;

FIGS. 2A and 2B are respective views of a magnetic recording medium and a magnetic sensor of an embodiment of the present invention;

FIG. 3 is a circuit diagram for deriving signals from the magnetic sensor shown in FIGS. 2A and 2B;

DESCRIPTION OF THE PREFERRED EMBODIMENTS

Figure 4:
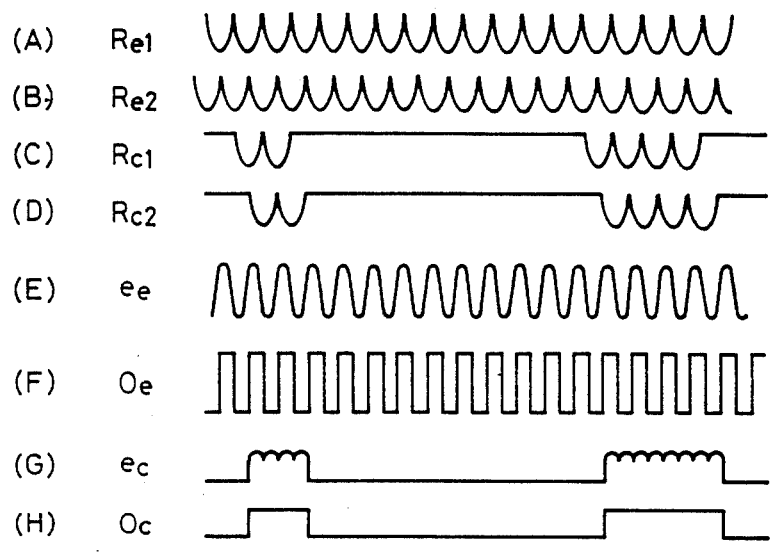
FIG. 4 illustrates waveform diagrams of outputs of the circuit shown in FIG. 3.

In FIG. 1, reference numeral 1 denotes a shaft rotating in synchronization with an engine crankshaft (not shown) and at a speed of rotation half of that of the engine crankshaft. Reference numeral 2 denotes a housing and 3 a nonmagnetic drum directly joined to the shaft 1. A magnetic recording medium 30 of a magnetic material is fitted on the surface of the nonmagnetic drum 3. Reference numeral 4 denotes a magnetic sensor formed of magnetoresistive elements and fitted to the housing 2 by means of a fitting block 5. Moreover, reference numeral 6 denotes an output terminal for deriving signals from the magnetic sensor 4 and 7 a bearing. Reference numeral 8 denotes a shield plate for absorbing magnetic noise or field noise generated by a side electrode 14, a distributor electrode 15 and a central electrode 12 which are provided for distributing a high voltage for ignition. Reference numeral 11 denotes a distributor rotor and 13 a case.

FIGS. 2A and 2B are respective views of the magnetic recording medium 30 and the magnetic sensor 4 shown in FIG. 1. The magnetic recording medium 30 is divided into two tracks of data, and data in the form of unitary N-S magnetic poles are recorded consecutively at a pitch P over the whole circumference of one of the tracks, which is called an angle track 31. On the other track, data representative of the number of cylinders of the engine are recorded corresponding to the respective cylinders. This track is called a cylinder track 32. In a case of the crank angle sensor for a four-cylinder engine, each one of these data sets recorded on the cylinder track 32 is composed of two to five consecutive unitary magnetic N-S poles. The polarity (N or S) of the unitary magnetic poles on the cylinder track 32 is provided so that it is in the same arrangement as the polarity N or S of the adjacent unitary magnetic poles of the angle track 31 which is disposed adjacent to the cylinder track 32. Accordingly, no magnetic interference occurs between the angle track 31 and the cylinder track 32.

In the magnetic sensor 4 facing the magnetic recording medium 30, magnetoresistive elements $R_{e1}$ and $R_{e2}$ are disposed opposite to the angle track 31 and are separated by a pitch P/2, as shown in FIG. 2B, where P is the pitch of the unitary magnetic poles and corresponds to the angle to be detected during rotation of the crankshaft. Moreover, magnetoresistive elements $R_{c1}$ and $R_{c2}$ are disposed opposite to the cylinder track 32 and separated from each other by a pitch P/2. These magnetoresistive elements $R_{e1}$, $R_{e2}$, $R_{c1}$ and $R_{c2}$ are formed of a thin film of a ferromagnetic substance and have such a property that the electric resistance thereof decreases when a magnetic field is applied at a right angle to the direction of current flows. As the magnetic recording medium 30 is rotated, therefore, a change in resistance corresponding to the data stored on each of the tracks 31 and 32 occurs in each of the magnetoresistive elements $R_{e1}$, $R_{e2}$, $R_{c1}$ and $R_{c2}$.

The magnetoresistive elements $R_{e1}$, $R_{e2}$, $R_{c1}$ and $R_{c2}$ constituting the magnetic sensor 4 are connected as shown in FIG. 3. The magnetoresistive elements $R_{e1}$ and $R_{e2}$ are connected in series, and both ends of the series connection are connected across a power source V. Moreover, a connecting point a of the magnetoresistive elements $R_{e1}$ and $R_{e2}$ is coupled to one input terminal of a voltage comparator 33. The other input terminal of this voltage comparator 33 is connected to a connecting point b of a series connection formed of two fixed resistances $R_{f1}$ and $R_{f2}$ which are connected across the power source V. Accordingly, a bridge is constructed by the magnetoresistive elements $R_{e1}$ and $R_{e2}$ and the fixed resistances $R_{f1}$ and $R_{f2}$. A series circuit of the magnetoresistive element $R_{c1}$ and a fixed resistance $R_{f4}$ and a series circuit of a fixed resistance $R_{f3}$ and the magnetoresistive element $R_{c2}$ are connected at opposite ends thereof across the power source V respectively, and a bridge is formed with respective connecting points c and d of those series circuits serving as output terminals. The output terminals of this bridge are connected to the respective input terminals of a voltage comparator 34.

When the magnetic recording medium 30 is rotated, the resistances of the magnetoresistive elements $R_{e1}$, $R_{e2}$, $R_{c1}$ and $R_{c2}$ of the magnetic sensor and the voltages appearing across the points a, b and c, d have waveforms respectively as shown in FIG. 4. In detail, the resistances of the magnetoresistive elements $R_{e1}$ and $R_{e2}$ change in accordance with the change in the magnetic field caused by the angle track 31 of the rotating magnetic recording medium 30, as shown by waveforms (A) and (B) in FIG. 4, and thus the resistance changes at every pitch P of the unit magnetic poles. Changes in the resistance occur with a phase difference of 180 degrees, since there is a pitch difference of a P/2 between the magnetoresistive elements $R_{e1}$ and $R_{e2}$. The resistances of the magnetoresistive elements $R_{c1}$ and $R_{c2}$ also change in accordance with the data stored on the cylinder track 32, in the same way as those of the magnetoresistive elements $R_{e1}$ and $R_{e2}$, as shown as waveforms (C) and (D) of FIG. 4.

The voltage $e_e$ appearing across the points a, b of the resistance bridge which is formed by the magnetoresistive elements $R_{e1}$ and $R_{e2}$ and the fixed resistances $R_{f1}$ and $R_{f2}$ is shown in FIG. 4 as waveform (E), and the output $O_e$ of the voltage comparator 33 shown in FIG. 3 is a square wave as shown as waveform (F) in FIG. 4. Since the output $O_e$ as show in FIG. 4 as waveform (F) is generated corresponding to the angle detrmined by the length of the pitch of the magnetic pole and the length of the circumference of the nonmagnetic drum 3, the angle from a reference point set beforehand can be measured by a method in which the output pulses of the voltage comparator 33 are counted from the reference point.

The voltage $e_c$ appearing across the points c, d of the resistance bridge including the magnetoresistive elements $R_{c1}$ and $R_{c2}$ is shown in FIG. 4 as waveform (G). The edge portion of the waveform of this voltage $e_c$ is well defined, corresponding to the pitch P of a unitary magnetic pole, and the same accuracy as the angle signal is attained. When the waveform as shown in FIG. 4 as waveform (G) is shaped by the voltage comparator 34, the output $O_c$ delivered therefrom becomes a square wave as shown in FIG. 4 as waveform (H). The shape of the output $O_c$ as shown in FIG. 4 as waveform (H) is cylinder-dependent, and thus it is possible to determine which output is the cylinder signal of a given cylinder by changing the pulse width of the output $O_c$ from the voltage comparator 34 for each cylinder.

Here it is to be noted that there always occurs an integral number in pulses of the angle signal, as shown in FIG. 4 as waveform (F) for the pulse duration of a cylinder signal, as shown in FIG. 4 as waveform (H). This will be easily understood from the structure of the angle track 31 and the cylinder track 32 shown in FIG. 2A. Therefore, a particular cylinder is specified by counting the pulses within a angle signal $O_e$ during the pulse width of the cylinder signal $O_c$; in other words, by measuring the pulse width of the cylinder signal $O_c$ by means of the number of pulses of the angle signal $O_e$.

Figure 5:
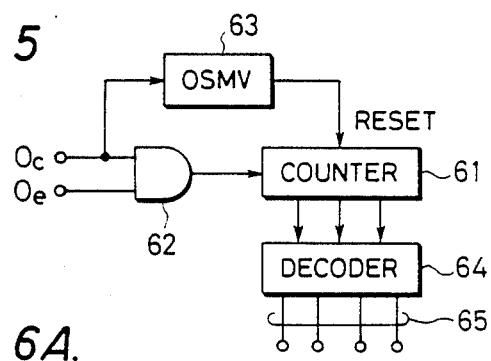
FIG. 5 is a block diagram of apparatus for specifying a particular cylinder of the engine on the basis of outputs of the circuit shown in FIG. 3.

An example of an apparatus for that purpose is shown in FIG. 5. This apparatus comprises a counter 61 which counts the pulses of the angle signal $O_e$ applied through an AND gate 62. In the case of the example shown in FIG. 2 where two to five unitary magnetic poles are provided in the cylinder track 32 corresponding to the respective cylinders of a four cylinder engine, there are five pulses in the angle signal for the widest pulse of the cylinder signal $O_c$. Accordingly, a three bit counter is sufficient for the counter 61. The AND gate 62 is also supplied with the pulses of the cylinder signal $O_c$. There is further provided a one shot multivibrator 63. Multivibrator 63 is triggered by the trailing edge of the cylinder signal pulse $O_c$, and a reset pulse of the counter 61 is produced by the trailing edge of the output of the multivibrator 63. Accordingly, the reset pulse of the counter 61 is delayed by the time constant of the multivibrator 63 from the end of the cylinder signal pulse. Therefore, counter 61 repeatedly counts the pulses of the angle signal $O_e$ during every pulse of the cylinder signal $O_c$. The contents of the counter 61 are coupled to a decoder 64, wherein the counted value is decoded and the decoded value is applied to terminals 65. A cylinder is specified by a signal appearing on each of the terminals 65.

This method in which the duration of the cylinder signal $O_c$ is measured by the pulses of the angle signal $O_e$ has the following advantage. The duration of the cylinder signal $O_c$ varies in accordance with the rotational speed of the engine crankshaft. If, therefore, the duration of this signal $O_c$ is measured by time, for example, by using clock pulses, the measured value with respect to the same cylinder changes in dependence on the change in the rotational speed of the engine crankshaft, so that it becomes difficult to specify a particular cylinder. In this embodiment, however, it is easy, in spite of a variation in the rotational speed of the engine crankshaft, to specify a particular cylinder, because there always exists a fixed number of pulses of the angle signal $O_e$ for the respective pulses of the cylinder signal $O_c$, as mentioned above.

Figures 6A, 6B:
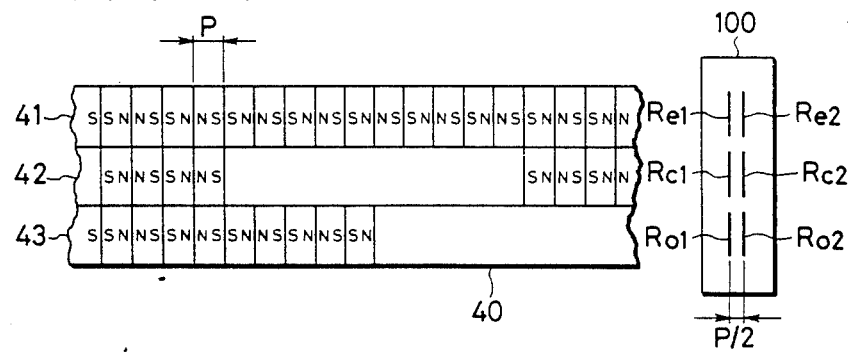
FIGS. 6A and 6B are respective views of a magnetic recording medium and a magnetic sensor of another embodiment of the present invention.

Another embodiment of the present invention is shown in FIGS. 6A and 6B. This embodiment differs from the embodiment of FIGS. 2A and 2B in that a reference position track for detecting data representative of one reference position for each rotation of the crankshaft is provided on a magnetic recording medium 40, in addition to the angle track representing angle information proportional to angle and the cylinder track representing cylinder information. FIGS. 6A and 6B show respective views of the magnetic recording medium 40 and a magnetic sensor 100. In magnetic recording medium 40 an angle track 41 and a cylinder track 42 are provided in the same way as in the magnetic recording medium 30 of FIG. 2A. Angle signals and cylinder signals are recorded on these two tracks in the same way as in the magnetic recording medium 30 of FIG. 2A. However, in this embodiment, there is also provided on cylinder track 42, data in the form of an equal number of unitary magnetic poles for every cylinder. Namely, four unit magnetic poles are provided for each cylinder, as shown in FIG. 6A. The reason for this will become apparent later.

Figure 7:
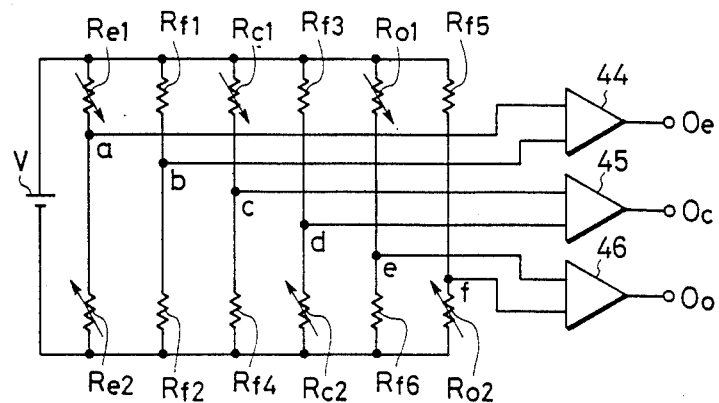
FIG. 7 is a circuit diagram for deriving signals from the magnetic sensor of the embodiment of FIGS. 6A and 6B.

Also provided is a reference position track 43 for generating one signal for each rotation of the crankshaft as a reference signal. On this reference position track 43, unitary magnetic poles having the same pitch P as that of the unit magnetic poles used on tracks 41 and 42 are provided continuously over half of the circumference, while nothing is recorded in the other half thereof. In the magnetic sensor 100 facing the magnetic recording medium 40, the magnetic reluctance elements $R_{e1}$ and $R_{e2}$ are disposed corresponding to the angle track 41, and the magnetoresistive elements $R_{c1}$ and $R_{c2}$ corresponding to the cylinder track 42, in the same way as those in FIGS. 2A and 2B, while magnetoresistive elements $R_{o1}$ and $R_{o2}$ are disposed corresponding to the reference position track 43 in such a manner that they are spaced from each other by a pitch P/2 which is a half of the unitary magnetic pole pitch P. These magnetoresistive elements $R_{e1}$, $R_{e2}$, $R_{c1}$, $R_{c2}$, $R_{o1}$ and $R_{o2}$ are connected so that they form three resistance bridges, together with fixed resistances $R_{f1}$ to $R_{f6}$, as shown in FIG. 7.

One end of each of the magnetoresistive elements $R_{e1}$, $R_{c1}$ and $R_{o1}$ and the fixed resistances $R_{f1}$, $R_{f3}$ and $R_{f5}$ is connected commonly to one of terminals of a power source V. The magnetoresistive element $R_{e2}$ is connected to the other end of the magnetoresistive element $R_{e1}$, the fixed resistance $R_{f2}$ to that of the fixed resistance $R_{f1}$, the fixed resistance $R_{f4}$ to that of the magnetoresistive element $R_{c1}$, the magnetoresistive element $R_{c2}$ to that of the fixed resistance $R_{f3}$, the fixed resistance $R_{f6}$ to that of the magnetoresistive element $R_{o1}$, and the magnetoresistive element $R_{o2}$ to that of the fixed resistance $R_{f5}$, respectively. The other ends of these magnetoresistive elements $R_{e2}$, $R_{c2}$ and $R_{o2}$ and fixed resistances $R_{f2}$, $R_{f4}$ and $R_{f6}$ are connected to the other terminal of the power source V.

One input terminal of a voltage comparator 44 is connected to a connecting point a of the magnetoresistive element $R_{e1}$ and $R_{e2}$, while the other input terminal thereof is connected to a connecting point b of the fixed resistances $R_{f1}$ and $R_{f2}$. These magnetoresistive elements $R_{e1}$ and $R_{e2}$ and fixed resistances $R_{f1}$ and $R_{f2}$ form one bridge. One input terminal of a voltage comparator 45 is connected to a connecting point c of the magnetoresistive element $R_{c1}$ and the fixed resistance $R_{f4}$, while the other input terminal thereof is connected to a connecting point d of the fixed resistance $R_{f3}$ and the magnetoresistive element $R_{c2}$. Thus, a bridge is formed by the magnetoresistive elements $R_{c1}$ and $R_{c2}$ and the fixed resistances $R_{f3}$ and $R_{f4}$. Similarly, one input terminal of a voltage compaator 46 is connected to a connecting point e of the magnetoresistive element $R_{o1}$ and the fixed resistance $R_{f6}$, while a connecting point f of the fixed resistance $R_{f5}$ and the magnetoresistive element $R_{o2}$ is connected to the other input terminal of the voltage comparator 46. These magnetoresistive elements $R_{o1}$ and $R_{o2}$ and fixed resistances $R_{f5}$ and $R_{f6}$ form a bridge.

Figure 8:
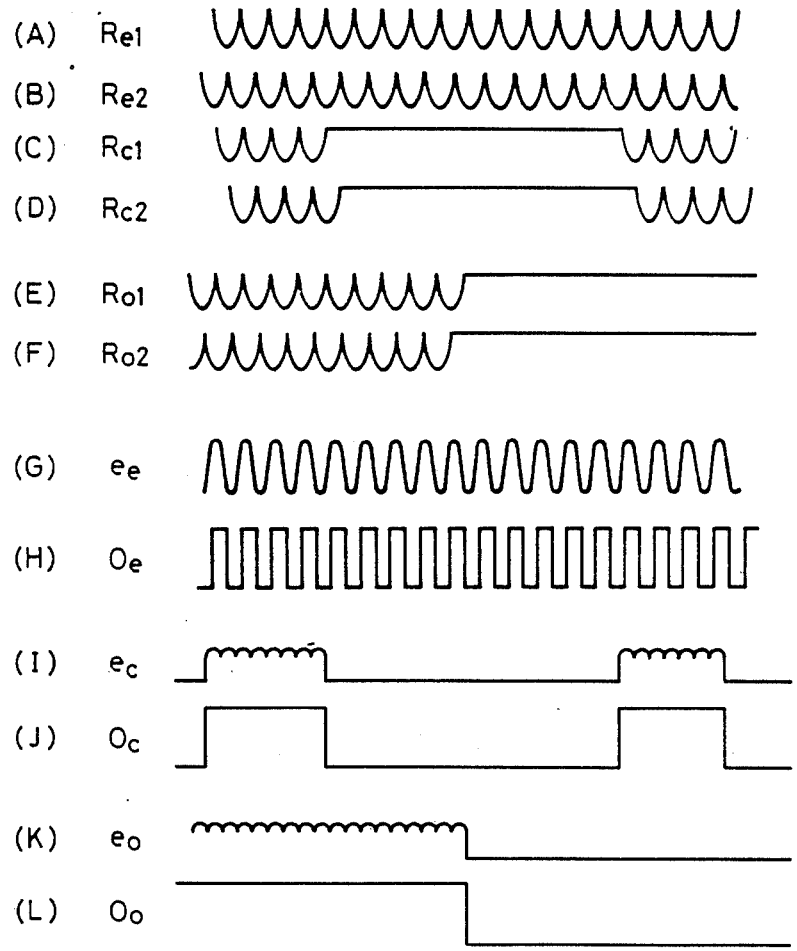
FIG. 8 illustrates waveform diagrams of outputs of the circuit shown in FIG. 7.

When the magnetic recording medium 40 is rotated, the resistances of the magnetoresistive elements $R_{e1}$, $R_{e2}$, $R_{c1}$, $R_{c2}$ $R_{o1}$ and $R_{o2}$ change as shown in waveforms (A), (B), (C), (D), (E) and (F) of FIG. 8. As a result, across the points a and b, c and d, and e and f of the bridges shown in FIG. 7, the output voltages $e_e$, $e_c$ and $e_o$ shown as waveforms (G), (I) and (K) in FIG. 8 are obtained. These signals $e_e$, $e_c$ and $e_o$ are coupled respectively to the voltage comparators 44, 45 and 46. A signal $o_e$ delivered from the output terminal of the voltage comparator 44 is a square wave as shown in FIG. 8 as waveform (H). A signal $o_c$ delivered from the output terminal of the volage comparator 45 is a square wave as shown in FIG. 8 as waveform (J). Moreover, the output appearing across the points e and f takes a waveform (K) as shown in FIG. 8 as described above, so that the edge portion of the waveform is the same as that of an angle signal, and the signal thus obtained is very accurate. The signal shown in FIG. 8 as waveform (K)

is obtained as a signal $O_o$ as shown in FIG. 8 as waveform (L) from the output terminal of the voltage comparator 46. Since the angle information $O_e$ which is highly accurate and free from magnetic interference and the cylinder information $O_c$ and the reference information $O_o$ are obtained as described above, it becomes possible to control an internal combustion engine accurately.

In the embodiment of FIG. 2, a particular cylinder is specified by a method in which the pulse width of the cylinder signal is measured by the number of the angle signal pulses. In this embodiment, however, it is impossible to specify a particular cylinder by means of such a method, because every pulse of the cylinder signal produced by voltage comparator 45 has the same pulse width, as shown in FIG. 8 as waveform (J). This results from the fact that on the cylinder track 42 of this embodiment there is provided an equal number of unitary magnetic poles for each cylinder. Therefore, in this embodiment, a reference signal $O_o$ as shown in FIG. 8 as waveform (L) is utilized for the purpose of specifying a particular cylinder. That is to say, pulses of the cylinder signal $O_c$ are counted from the time point of appearance or disappearance of the reference signal $O_o$, and a particular cylinder can be specified by the counted number.

Figures 9A, 9B:
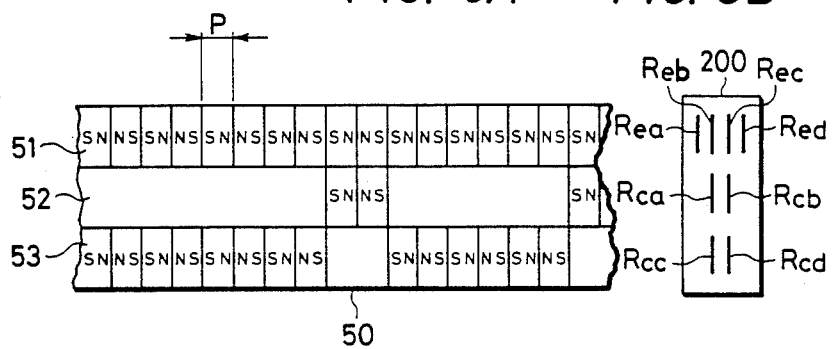
FIGS. 9A and 9B are respective views of a magnetic recording medium and a magnetic sensor of still another embodiment of the present invention.

Still another embodiment of the present invention is shown in FIGS. 9A and 9B. This embodiment differs from the embodiment of FIGS. 6A and 6B in the way information is stored on the cylinder track and the reference position track of the magnetic recording medium, and by the pattern of magnetoresistive elements disposed on the magnetic sensor. FIGS. 9A and 9B show respective views of a magnetic recording medium 50 and a magnetic sensor 200. On magnetic recording medium 50 an angle track 51 and a cylinder track 52 are provided in the same way as in the magnetic recording medium 40 of FIG. 6A, and angle signals and cylinder signals are recorded on these two tracks in the same way as in the magnetic recording medium 40 of FIG. 6A. As a third track, there is further provided a track 53 which, as shown in FIG. 9A, has unitary magnetic poles in a part corresponding to that part of the cylinder track 52 in which no unitary magnetic poles are provided.

Figure 10:
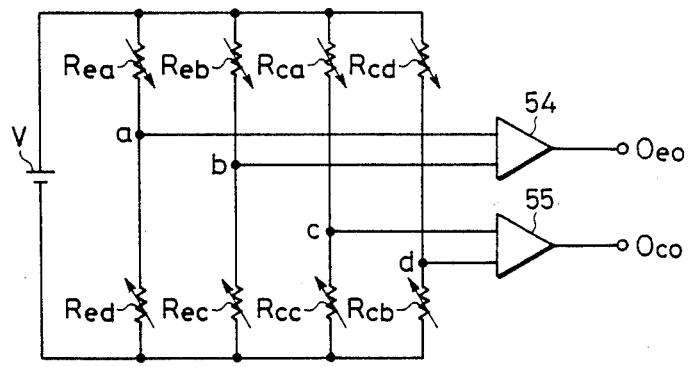
FIG. 10 is a circuit diagram for deriving signals from the magnetic sensor of the embodiment of FIGS. 9A and 9B.

In the magnetic sensor 200 spaced apart from the magnetic recording medium 50, magnetoresistive elements $R_{ea}$, $R_{eb}$, $R_{ec}$ and $R_{ed}$ are provided at a pitch P/2, or the unitary magnetic pole pitch P, corresponding to the angle track 51 in the same way as in FIG. 6A. Likewise, magnetoresistive elements $R_{ca}$ and $R_{cb}$ are provided at a pitch P/2 corresponding to the cylinder track 52, and further magnetoresistive elements $R_{cc}$ and $R_{cd}$ are provided at a pitch P/2 corresponding to the third track 53. By the magnetoresistive elements $R_{ea}$, $R_{eb}$, $R_{ec}$ and $R_{ed}$ a resistance bridge is formed as shown in FIG. 10. As is apparent from the figure, another resistance bridge is formed by the remaining magnetoresistive elements $R_{ca}$, $R_{cb}$, $R_{cc}$ and $R_{cd}$. These two bridges are both connected across a power source V. Further, a connecting point a of the elements $R_{ea}$ and $R_{ed}$ and a connecting point b of the elements $R_{eb}$ and $R_{ec}$ are coupled to two input terminals of a voltage comparator 54, and similarly a connecting point c of the elements $R_{ca}$ and $R_{cc}$ and a connecting point d of the elements $R_{cd}$ and $R_{cb}$ are coupled to two input terminals of voltage comparator 55.

Figure 11:
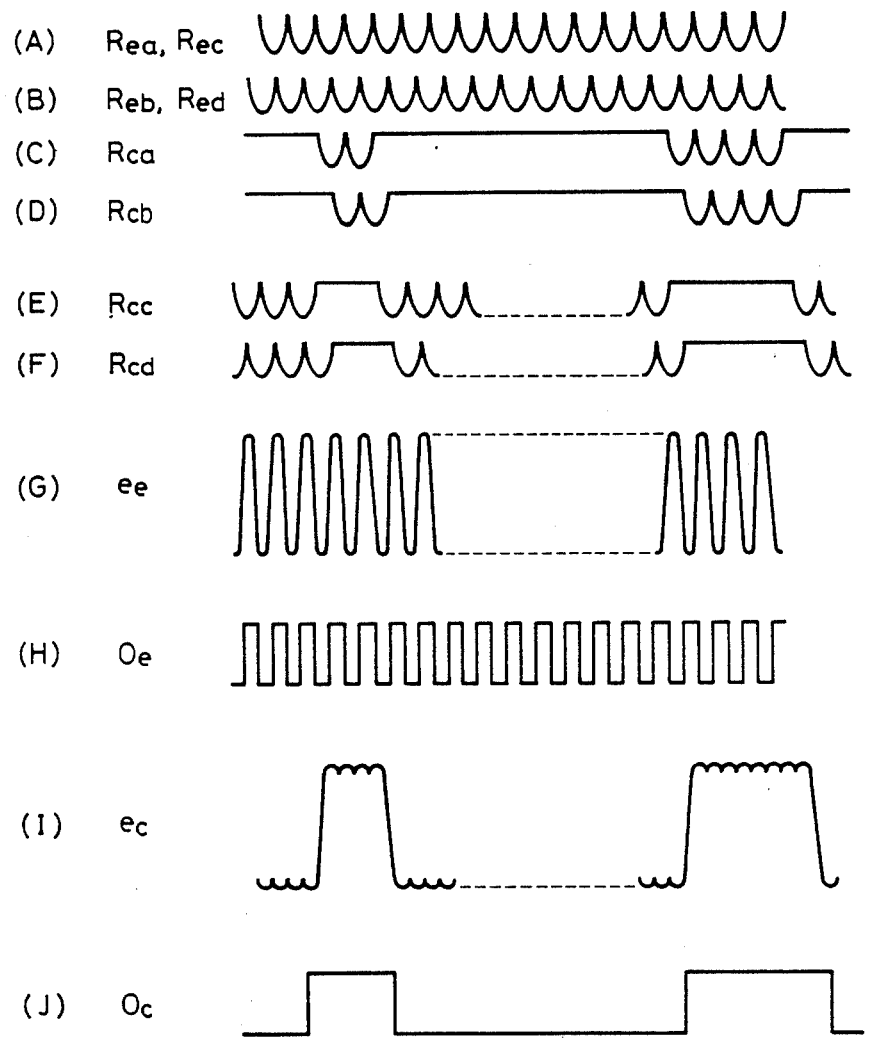
FIG. 11 illustrates waveform diagrams of outputs of the circuit shown in FIG. 10.

When the magnetic recording medium 50 is rotated, the resistances of the magnetoresistive elements $R_{ea}$, $R_{eb}$, $R_{ec}$, $R_{ed}$, $R_{ca}$, $R_{cb}$ $R_{cc}$ and $R_{cd}$ change as shown in FIG. 11 by waveforms (A), (B), (C), (D), (E) and (F). As a result, the output voltages $e_e$ and $e_c$ as shown in FIG. 11 at waveforms (G) and (I) appear across the points a and b, and c and d of the bridges shown in FIG. 10. Since the magnetoresistive elements $R_{ea}$, $R_{eb}$, $R_{ec}$ and $R_{ed}$ are provided at a pitch P/2 on the magnetic sensor corresponding to the angle track 51 of the magnetic recording medium 50 as shown in FIG. 9A and four arms of the bridge are formed by the magnetoresistive elements $R_{ea}$, $R_{eb}$, $R_{ec}$ and $R_{ed}$ as shown in FIG. 10, a larger output $e_e$ than that of the bridges of FIGS. 3 and 7 can be obtained. Such a construction enables an improvement in the S/N ratio and a more accurate square wave. The output voltage $e_e$ is coupled to voltage comparator 54, so that a signal $O_{eo}$ delivered from the output terminal of the voltage comparator 54 becomes a square wave as shown in FIG. 11 at waveform (H). The voltage $e_c$ appearing across the points c and d has a waveform as shown in FIG. 11 at waveform (I). The voltage $e_c$ thus obtained has an amplitude twice as large as that of FIG. 8 at waveform (I), and voltage output is better defined than that of the output of the bridge of FIG. 7. The output voltage $e_c$ is applied to voltage comparator 55, so that a signal $O_{co}$ delivered from the output terminal of the voltage comparator 55 becomes a square wave as shown in FIG. 11 at waveform (J). Thus, an accurate signal having a well-defined edge can be obtained.

In this way, angle information $O_{eo}$ and cylinder information $O_{co}$ being highly accurate and free from magnetic interference can be obtained according to the present embodiment. A reference signal as shown in FIG. 8 at waveform (L) is unnecessary in this case if each cylinder can be made to have a reference by varying the pulse length of the output of the cylinder information $O_{co}$ for each cylinder.

While the magnetic recording medium is preferably configured in the shape of a rotary drum in any of the above described embodiments, quite the same effect can be produced by use of a rotary disk, constructing each track concentrically, and disposing also concentrically the magnetic sensor 4 facing the medium.

According to the present invention, as described above, signals having a different output pulse width can be detected with high accuracy, since the edge of a detected signal can be well-defined without causing any magnetic interference, and thus the present invention has the effect that angle signals, cylinder signals and further reference signals of a crankshaft can be detected with high accuracy.

We claim:

1. A crank angle sensor for generating signals representative of the rotation of the crankshaft of an internal combustion engine comprising:

a magnetic recording medium coupled to said crankshaft so as to rotate in synchronism therewith, and containing a plurality of recording tracks including at least a first and a second track and wherein on respective ones of said recording tracks data is magnetically recorded in the form of unitary magnetic poles, the magnetic poles of said first of said tracks having a pitch P between the poles thereof and being representative of the angle of rotation of said crankshaft, and each of the magnetic poles of said second track having said pitch P between the poles thereof and being distributed at prescribed locations along said second track with the magnetic polarities thereof being oriented in the same manner as the polarities of the respective magnetic poles of said first track;

a magnetic sensor spaced apart from said magnetic recording medium and containing respective pairs of magnetoresistive elements arranged to be magnetically coupled with each of the respective recording tracks of said recording medium, the magnetoresistive elements of a respective pair of elements being spaced apart from one another by effectively one-half said pitch P in the direction of relative motion between said sensor and said recording medium; and wherein the magnetic poles of said second recording track are distributed at predetermined locations along said second track in respective pluralities corresponding to the number of cylinders of said engine.

2. A crank angle sensor according to claim 1, wherein the number of magnetic poles of a respective one of the pluralities of magnetic poles that are distributed at said predetermined locations along said second track is different from the number of magnetic poles of the others of said pluralities.

3. A crank angle sensor according to claim 2, wherein said magnetic sensor includes means for deriving, from magnetoresistive elements magnetically coupled with said first recording track, a plurality of first signals and for deriving, from magnetoresistive elements magnetically coupled with said second track, respective second signals, and means for measuring the duration of respective ones of said second signals based upon said first signals.

4. A crank angle sensor according to claim 3, wherein said measuring means comprises means for generating an output signal the duration of which is associated with a prescribed one of the cylinders of the engine by counting the number of first signals corresponding to the duration of a respective second signal.

5. A crank angle sensor according to claim 1, wherein the plurality of recording tracks include a third recording track characterized by having magnetic poles; each of the magnetic poles of said third recording track have said pitch P between the poles thereof and are distributed at a preestablished location on said third track representative of a reference position of said crankshaft, and said magnetic sensor includes means for deriving, from magnetoresistive elements magnetically coupled with said third recording track, a first signal and for deriving, from magnetoresistive elements magnetically coupled with said second track, respective second signals, and means for counting second signals in response to the detection of a prescribed characteristic of said first signal to thereby identify a particular engine cylinder.

6. A crank angle sensor according to claim 5, wherein said prescribed characteristics corresponds to one of the appearance or disappearance of said first signals.

7. A crank angle sensor according to claim 5, wherein the magnetic poles corresponding to each recording track being polarized such that respective adjacent poles in the recording track being further oriented to have oppositely directed polarities and the boundaries of each of the magnetic poles in adjacent recording tracks are commonly aligned with the respective boundaries of the individual magnetic poles of the remaining recording tracks.

8. A crank angle sensor according to claim 1, wherein said magnetic sensor further includes an additional pair of magnetoresistive elements arranged with the pair of elements associated with said first track spaced apart therefrom by effectively one-half said pitch P in the direction of relative motion between said sensor and said recording medium, and a bridge circuit coupled to said pair of elements and said additional pair of elements, for supplying an output signal.

9. A crank angle sensor according to claim 1, wherein the plurality of recording tracks include a third recording track characterized by having magnetic poles; each of the magnetic poles of said third recording track are distributed at locations therealong adjacent to locations of said second recording track whereat magnetic poles corresponding to said second recording track are not distributed and wherein magnetic poles of said second track are distributed therealong adjacent to locations of said third track whereat magnetic poles are not distributed.

10. A crank angle sensor according to claim 9, wherein said magnetic sensor means includes a bridge circuit coupled to respective pairs of magnetoresistive elements associated with said second track and said third track for supplying an output signal.

11. A crank angle sensor according to claim 10, wherein said magnetic sensor further includes an additional pair of magnetoresistive elements arranged with a pair of elements associated with said first track spaced apart therefrom by effectively one-half said pitch P in the direction of relative motion between said sensor and said recording medium, and a bridge circuit coupled to said pair of elements and said additional pair of elements, for supplying an output signal.

12. A crank angle sensor according to claim 1, wherein the magnetic poles corresponding to each recording track being polarized such that respective adjacent poles in the recording track being further oriented to have oppositely directed polarities and the boundaries of each of the magnetic poles in adjacent recording tracks are commonly aligned with the respective boundaries of the individual magnetic poles of the remaining recording tracks.

13. A crank angle sensor for generating signals representative of the rotation of the crankshaft of an internal combustion engine comprising:

a magnetic recording medium adapted to be coupled to said crankshaft so as to rotate in synchronism therewith, and containing a plurality of recording tracks including at least a first and a second track and wherein on respective ones of said recording tracks data is magnetically recorded in the form of unitary magnetic poles, the magnetic poles of said first of said tracks having a pitch P between the poles thereof and being representative of the angle of rotation of said crankshaft, and each of the magnetic poles of said second track having said pitch P between the poles thereof and being distributed at prescribed locations along said second track in respective pluralities corresponding to the number of cylinders of said engine with the magnetic polarities thereof being oriented in the same manner as the polarities of the respective magnetic poles of said first track; and a magnetic sensor spaced apart from said magnetic recording medium and containing respective pairs of magnetoresistive elements arranged to be magnetically coupled with each of the respective recording tracks of said recording medium.

14. A crank angle sensor according to claim 13, wherein the number of magnetic poles of a respective one of the pluralities of magnetic poles that are distributed at said predetermined locations along said second track is different from the number of magnetic poles of the others of said pluralities.

15. A crank angle sensor according to claim 14, wherein the plurality of recording tracks include a third recording track characterized by having magnetic poles; each of the magnetic poles of said third recording track having said pitch P between the poles thereof and are distributed at a preestablished location on said third track representative of a reference position of said crankshaft, and said magnetic sensor includes means for deriving, from magnetoresistive elements magnetically coupled with said third recording track, a first signal and for deriving, from magnetoresistive elements magnetically coupled with said second track, respective second signals, and means for counting second signals in response to the detection of a prescribed characteristic of said first signal to thereby identify a particular engine cylinder.

16. A crank angle sensor according to claim 15, wherein said prescribed characteristic corresponds to one of the appearance or disappearance of said first signals.

17. A crank angle sensor according to claim 13, wherein the plurality of recording tracks include a third recording track characterized by having magnetic poles; each of the magnetic poles of said third recording track are distributed at locations therealong adjacent to locations of said second recording track whereat magnetic poles corresponding to said second recording tracks are not distributed and wherein magnetic poles of said second track are distributed therealong adjacent to locations of said third track whereat magnetic poles are not distributed.

18. A crank angle sensor according to claim 17, wherein said magnetic sensor further includes an additional pair of magnetoresistive elements arranged with the pair of elements associated with said first track spaced apart therefrom by effectively one-half said pitch P in the direction of relative motion between said sensor and said recording medium, and a bridge circuit coupled to said pair of elements and said additional pair of elements, for supplying an output signal.

19. A crank angle sensor for generating signals representative of the rotation of the crankshaft of an internal combustion engine comprising:
a magnetic recording medium being coupled to said crankshaft so as to rotate in synchronism therewith, and containing a plurality of recording tracks including at least a first and a second track and wherein on respective ones of said recording tracks data is magnetically recorded in the form of unitary magnetic poles, the magnetic poles of said first of said tracks having a pitch P between the poles thereof and being representative of the angle of rotation of said crankshaft, and each of the magnetic poles of said second track having said pitch P between the poles thereof and being distributed at prescribed locations along said second track with the magnetic polarities thereof being oriented in the same manner as the polarities of the respective magnetic poles of said first track;
a magnetic sensor spaced apart from said magnetic recording medium and containing respective pairs of magnetoresistive elements arranged to be magnetically coupled with each of the respective recording tracks of said recording medium, the magnetoresistive elements of a respective pair of elements being spaced apart from one another by effectively one-half said pitch P in the direction of relative motion between said sensor and said recording medium; and
wherein the plurality of recording tracks include a third recording track characterized by having magnetic poles, each of the magnetic poles of said third recording track being distributed at locations therealong adjacent to locations of said second recording track whereat magnetic poles corresponding to each second recording track are not distributed and wherein magnetic poles of said second track being distributed therealong adjacent to locations of said third track whereat magnetic poles are not distributed.

20. A crank angle sensor according to claim 19, wherein said magnetic sensor further includes an additional pair of magnetoresistive elements arranged with the pair of elements associated with said first track spaced apart therefrom by effectively one-half said pitch P in the direction of relative motion between said sensor and said recording medium, and a bridge circuit coupled to said pair of elements and said additional pair of elements, for supplying an output signal.

* * * * *